United States Patent
Li

(10) Patent No.: US 11,225,160 B2
(45) Date of Patent: Jan. 18, 2022

(54) ENERGY STORAGE DEVICE CHARGING SYSTEM APPLIED TO SOLID STATE TRANSFORMER STRUCTURE AND THREE-PHASE POWER SYSTEM HAVING THE SAME

(71) Applicant: DELTA ELECTRONICS, INC., Taoyuan (TW)

(72) Inventor: Sheng-Hua Li, Taoyuan (TW)

(73) Assignee: Delta Electronics, Inc., Taoyuan (TW)

(*) Notice: Subject to any disclaimer, the term of this patent is extended or adjusted under 35 U.S.C. 154(b) by 0 days.

(21) Appl. No.: 16/899,933

(22) Filed: Jun. 12, 2020

(65) Prior Publication Data

US 2021/0078427 A1 Mar. 18, 2021

(30) Foreign Application Priority Data

Sep. 17, 2019 (CN) .......................... 201910876683.X

(51) Int. Cl.
*B60L 53/50* (2019.01)
*H02M 7/04* (2006.01)
*B60L 53/62* (2019.01)
*B60L 53/67* (2019.01)

(52) U.S. Cl.
CPC ............... *B60L 53/50* (2019.02); *B60L 53/62* (2019.02); *B60L 53/67* (2019.02); *H02M 7/043* (2013.01); *B60L 2210/10* (2013.01); *B60L 2210/20* (2013.01); *B60L 2210/30* (2013.01)

(58) Field of Classification Search
CPC .......... B60L 53/50; B60L 53/62; B60L 53/67; B60L 2210/10; B60L 53/20; B60L 53/30; B60L 53/40; H02M 7/043
USPC .......................................................... 307/127
See application file for complete search history.

(56) References Cited

U.S. PATENT DOCUMENTS

| | | | |
|---|---|---|---|
| 9,960,601 B2 | 5/2018 | Matan et al. | |
| 10,274,985 B2 | 4/2019 | Powell et al. | |
| 2018/0162229 A1* | 6/2018 | Gotz | H02J 7/0027 |
| 2020/0001730 A1* | 1/2020 | Gohla-Neudecker | B60L 53/11 |

FOREIGN PATENT DOCUMENTS

| | | |
|---|---|---|
| CN | 106602565 A | 4/2017 |
| TW | 2013-51155 A | 12/2013 |
| TW | I671537 B | 9/2019 |

\* cited by examiner

Primary Examiner — Hal Kaplan
(74) Attorney, Agent, or Firm — Muncy, Geissler, Olds & Lowe, P.C.

(57) ABSTRACT

An energy storage device charging system applied to a solid state transformer structure is coupled to a power grid and charges a plurality of energy storage devices, or feeds power back to the power grid from the energy storage devices. The charging system includes a conversion module, a bus path, a charging module, and a control unit. A total power conversion capacity of the conversion module is less than a total charging power capacity of the charging module. The control unit respectively allocates a plurality of demand power capacities of the charging units according to a power conversion upper limit value of the total power conversion capacity.

17 Claims, 5 Drawing Sheets

ENERGY STORAGE DEVICE CHARGING SYSTEM APPLIED TO SOLID STATE TRANSFORMER STRUCTURE AND THREE-PHASE POWER SYSTEM HAVING THE SAME

BACKGROUND

Technical Field

The present disclosure relates to an energy storage device charging system applied to a solid state transformer structure, and more particularly to an energy storage device charging system having reduction of the size and reduction of the construction cost.

Description of Related Art

The statements in this section merely provide background information related to the present disclosure and do not necessarily constitute prior art.

In the field of electric vehicle charging, in order to charge the electric vehicle quickly, it is necessary to increase the power output of the charging station. However, to avoid insufficient power supply capacity of the charging module of the charging station, a power conversion capacity of the power conversion module coupled between the power grid and the charging module is increased for the conventional design of the charging station. Therefore, it is avoided the power conversion capacity cannot be satisfied to the demand power capacity of the charging module during the peak power consumption period, thereby limiting the amount of electricity charged to the electric vehicle and resulting in the inability to quickly charge the electric vehicle.

In order to increase the power supply capacity, the conventional charging station must increase the volume of the transformer in the power conversion module, and must design the power conversion capacity of the power conversion module to be larger than the demand power capacity of the charging module. In addition, the power converter module designed by the conventional transformer also does not have the function of bidirectional feeding. Therefore, the volume of the charging station cannot be reduced, the design cost cannot be reduced, and the addition power loss will be increased during the off-peak period.

For the reason above, how to design an energy storage device charging system applied to a solid state transformer structure to use the characteristics of the solid state transformer and unique control manners to reduce the cost of constructing the charging system, reduce the circuit volume, and reduce the power consumption is an important topic in the technical field.

SUMMARY

In order to solve the above-mentioned problems, an energy storage device charging system applied to a solid state transformer structure is provided. The charging system is coupled to a power grid and charges a plurality of energy storage devices or feeds power back to the power grid from the energy storage devices. The charging system includes a conversion module, a bus path, a charging module, and a control unit. The conversion module includes a plurality of conversion units, first ends of the conversion units are coupled in series and coupled to an AC power source. The bus path is coupled to second ends of the conversion units. The charging module includes a plurality of charging units, first ends of the charging units are coupled to the bus path and second ends of the charging units provide a plurality of DC power sources. The control unit is coupled to the charging units. A total power conversion capacity of the conversion module is less than a total charging power capacity of the charging module. The control unit respectively allocates a plurality of demand power capacities of the charging units according to a power conversion upper limit value of the total power conversion capacity.

In order to solve the above-mentioned problems, a three-phase power system applied to a solid state transformer structure is provided. The three-phase power system is coupled to a power grid and charges a plurality of energy storage devices or feeds power back to the power grid from the energy storage devices. The three-phase power system includes three charging systems. Each charging system is coupled to one phase AC power source of a three-phase AC power source. Each charging system includes a conversion module, a bus path, a charging module, and a control unit. The conversion module includes a plurality of conversion units, first ends of the conversion units are coupled in series and coupled to the AC power source. The bus path is coupled to second ends of the conversion units. The charging module includes a plurality of charging units, first ends of the charging units are coupled to the bus path and second ends of the charging units provide a plurality of DC power sources. The control unit is coupled to the charging units. A total power conversion capacity of the conversion module is less than a total charging power capacity of the charging module, the control unit respectively allocates a plurality of demand power capacities of the charging units according to a conversion upper limit value of the total power conversion capacity.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawings as follows.

DETAILED DESCRIPTION

Figure 1:
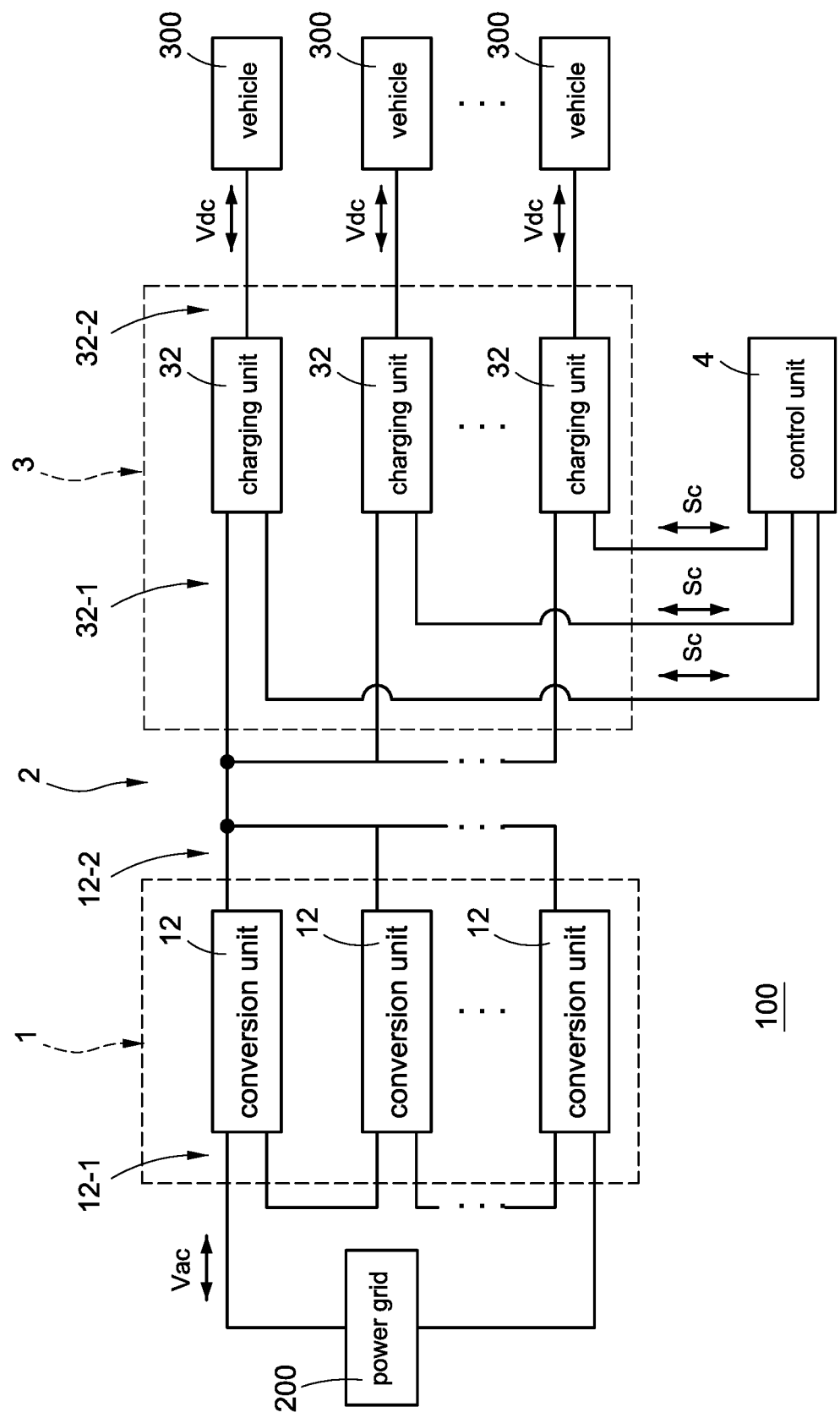
FIG. 1 is a block diagram of an energy storage device charging system applied to a solid state transformer (SST) structure according to the present disclosure.

Reference will now be made to the drawing figures to describe the present disclosure in detail. It will be understood that the drawing figures and exemplified embodiments of present disclosure are not limited to the details thereof.

Please refer to FIG. 1, which shows a block diagram of an energy storage device charging system applied to a solid state transformer (SST) structure according to the present disclosure. The charging system 100 is a bidirectional power system. When a power grid 200 charges a plurality of energy storage devices (hereinafter referred to as vehicles 300), the power grid 200 receives an AC power source Vac and converts the AC power source Vac into a plurality of DC power sources Vdc to charge the vehicles 300. The power source Vac is, for example, but not limited to, 4.8 kV to 35 kV. When the vehicles 300 feed power back to the power grid 200, the vehicles 300 receive the DC power sources Vdc and convert the DC power sources Vdc into the AC power source Vac and provide the AC power source Vac to the power grid 200. Each of the energy storage devices may be an electric vehicle (such as an electric car, an electric motorcycle), an energy storage system (ESS), or so on.

The charging system 100 includes a power conversion module 1, a bus path 2, a charging module 3, and a control unit 4. The power conversion module 1 is coupled to the power grid 200 and the bus path 2, and the charging module 3 is coupled to the bus path 2 and the vehicles 300. The power conversion module 1 includes a plurality of conversion units 12, and each conversion unit 12 has a first end 12-1 and a second end 12-2. The first ends of the conversion units 12 are coupled in series, and AC power source Vac are connected across the first ends 12-1 of the conversion units 12 so that a series-connected head end and a series-connected tail end are respectively connected to a live wire and a neutral wire of the AC power source Vac. One end of the bus path 2 is coupled to the second ends 12-2 of the conversion units 12, and the other end of the bus path 2 is coupled to the charging module 3. The charging module 3 includes a plurality of charging units 32, and each charging unit 32 has a first end 32-1 and a second end 32-2. The first ends 32-1 of the charging units 32 are coupled to the other end of the bus path 2 and the seconds 32-2 of the charging units 32 are coupled to the vehicles 300, respectively. The control unit 4 is coupled to the charging units 32 and communicates with the charging units 32 through control signals Sc. It should be noted that, the DC power source Vdc of each of the plurality of vehicles 300 is not necessarily the same voltage value, the voltage value thereof may be determined by the communication between each vehicle 300 (or ESS) and its corresponding charging unit 32.

In the practical use of the charging system 100, all of the charging units 32 are not coupled to the vehicles 300 at any time, and the number of the vehicles 300 is generally changed at different times of the day. For example, but not limited to, the charging system 100 provided in the residential area usually has more vehicles 300 coupled to the charging unit 32 during off-hours, and less during working hours. Therefore, during off-hours, the total power demand of the charging module 3 is usually higher, and less during working hours. The main feature of the present disclosure is that the charging system 100 designs the total power conversion capacity of the power conversion module 1 to be less than the total charging power capacity of the charging module 3, and allocates the demand power capacity of each charging unit 32 through the control unit 4. The total charging power capacity of the charging module 3 means the rated charging power capacity when all the charging units 32 are fully loaded. Therefore, although the total power conversion capacity of the power conversion module 1 is small, it is still possible to maintain stable operation of the charging system 100 during peak usage (namely, more vehicles 300 are coupled to the charging module 3) without causing the charging system 100 to exceed the upper limit and cause the input power to trip. For example, but not limited to, the total power conversion capacity of the power conversion module 1 is 50 kW, and the total charging power capacity of the charging module 3 is 60 kW. When the charging module 3 is fully loaded, namely, the control unit 4 realizes that the total demand power capacity of the charging module 3 is 60 kW (the demand power capacity of each charging unit 32 is summed) through the control signal Sc. At this condition, the control unit 4 can adjust the demand power capacity of each charging unit 32 according to the ratio (for example, reducing the demand power capacity of each charging unit 32 by 20% to reduce the total demand power capacity to 48 kW) so that the total demand power capacity (48 kW) is limited to be lower than the total power conversion capacity (50 kW).

Specifically, the control unit 4 realizes the demand power capacity of each charging unit 32 through the control signal Sc, and separately allocates the demand power capacity of each charging unit 32 according to the power conversion upper limit value of the total power conversion capacity so that the charging system 100 maintains that the sum of the demand power capacity is less than or equal to the total power conversion capacity at any time. For example, but not limited to, the control unit 4 can control the demand power capacity of the charging unit 32 that is not in use to be set to 0 kW by the control signal Sc, and control the total power conversion capacity to be equally distributed to the charging unit 32 in use according to the power conversion upper limit value.

The demand power capacity of each charging unit 32 has a charging upper limit value. Although the control unit 4 can control the total power conversion capacity to be equally distributed to the charging units 32 in use according to the power conversion upper limit value, the control unit 4 still limits the demand power capacity of the charging units 32 according to the charging upper limit values. For example, but not limited to, the total power conversion capacity is 50 kW, the charging upper limit value of the charging unit 32 is 10 kW, and only three charging units 32 are used. At this condition, the control unit 4 can control each of the three charging units 32 through the control signals Sc to provide power that cannot exceed 10 kW to the vehicle 300. Although the charging upper limit value of each charging unit 32 is 10 kW, when the control unit 4 recognizes that the demand power required by the vehicle 300 is less than 10 kW through the control signal Sc, the charging unit 32 should provide the demand power required by the vehicle 300 instead of 10 kW.

In this present disclosure, the power conversion module 1 is a solid state transformer (SST). The SST is a new type of intelligent transformer suitable for smart grid applications, and it is mainly used to replace the traditional large-scale, oil-immersed transformers used in the high-voltage power system. Specifically, the traditional transformers are usually operated at low-frequency high-voltage electricity so wires with a sufficiently large wire diameter are required to be wound into transformers to withstand low-frequency high-voltage electricity. Therefore, traditional transformers are bulky and cannot be used in environments where space is limited. Since the power conversion module 1 of the present disclosure has the series-connected conversion units 12 at the input end and the switches of the conversion units 12 operate at high frequency, the volume of the conversion unit 12 is small, and therefore the volume of the SST can be smaller than that of the traditional transformer used in the high voltage power. The SST can not only realize voltage conversion (conversion between high voltage and low voltage), electrical isolation, fault isolation, etc., but also realize frequency conversion (conversion between DC and AC) that cannot be realized by traditional transformers. Moreover, the SST has both AC and DC links, which can realize the conversion between four states of DC low voltage, DC high voltage, AC low voltage and AC high voltage. Therefore, in the case where the AC power source Vac of the present disclosure is a high voltage power (for example, but not limited to, 4.8 kV to 35 kV), it is particularly suitable for applying the SST for bidirectional conversion between a high voltage and a low voltage. Accordingly, the use of SST overcomes the disadvantage that the traditional transformer is only suitable for single frequency and cannot convert the voltage bidirectional.

Since the power conversion module 1 operates at a high frequency by the conversion units 12, the volume and weight of the charging system 100 can be significantly reduced. Moreover, since the total power conversion capacity of the power conversion module 1 of the present invention is designed to be smaller than the total charging power capacity of the charging module 3, the volume of the charging system 100 can be further reduced and the installation cost of the charging system 100 can be also reduced. Due to the design of small size of the charging system 100, the charging system 100 can be easily installed in a space where is limited. Since the total power conversion capacity of the power conversion module 1 of the charging system 100 is designed to be smaller than the total charging power capacity of the charging module 3, the power loss of the charging system 100 can be reduced during the off-peak period.

Further, the control unit 4 can receive an activation signal Sa (not shown) provided by the charging unit 32, and the activation signal Sa can represent, for example, but not limited to, identity, charging fees, power consumption period, and the like. For example, the charging system 100 is located in the residential community, and the control unit 4 can identify whether the vehicle 300 belongs to the community resident by the activation signal Sa. When the control unit 4 determines that it is the corresponding activation signal Sa, it represents that the vehicle 300 belongs to the community resident, and therefore the vehicle 300 has the charging priority. When the control unit 4 determines that it is non-corresponding activation signal Sa, it represents the vehicle 300 does not belong to the community resident, and therefore the vehicle 300 has only ordinary charging right. When the total demand power capacity of the charging units 32 is less than or equal to the total power conversion capacity of the power conversion module 1, the control unit 4 does not to redistribute the demand power capacity of each charging unit 32 of the charging module 3, the control unit 4 only limits the demand power capacity of each charging unit 32 to be less than or equal to the charging upper limit value. However, when the control unit 4 realizes that the total demand power capacity of the charging units 32 is greater than the total power conversion capacity of the power conversion module 1, the control unit 4 increases the demand power capacity according to the corresponding activation signal Sa of the charging unit 32. In particular, there are various ways to increase the demand power capacity of the charging unit 32 with corresponding activation signal Sa, such as increase by equal proportion, distribute equally according to the number of charging units 32 with activation signals Sa, allocate according to the charging level, or so on. When the control unit 4 increases the demand power capacity of the charging unit 32 with corresponding activation signal Sa, the total demand power capacity of the charging module 3 may be increased to be greater than or equal to the total power conversion capacity of the power conversion module 1, therefore, the control unit 4 reduces the demand power capacity of the charging unit 32 with non-corresponding activation signal Sa.

Figure 2A:
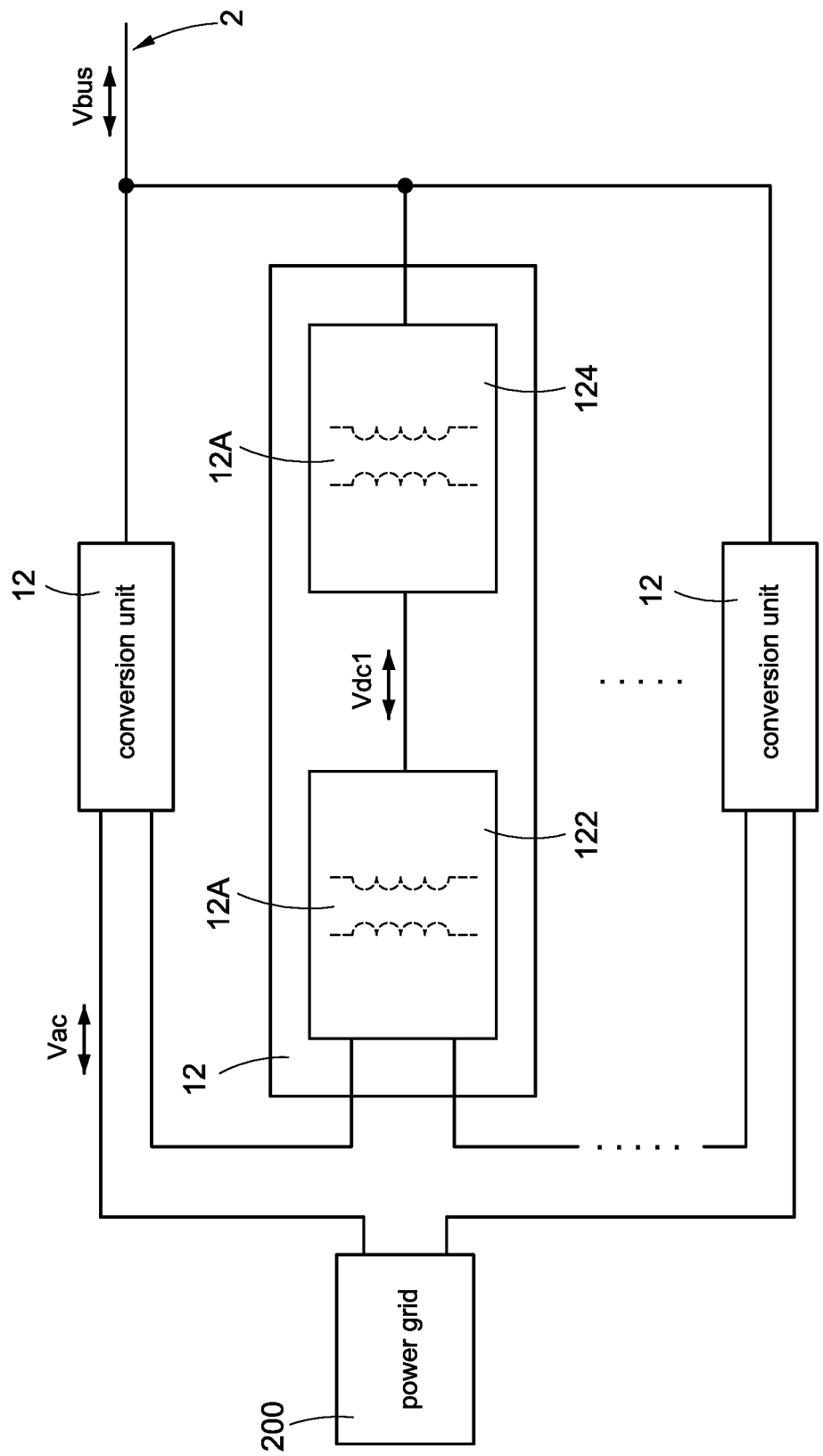
FIG. 2A is a block diagram of a conversion unit according to a first embodiment of the present disclosure.

Please refer to FIG. 2A, which shows a block diagram of a conversion unit according to a first embodiment of the present disclosure, and also refer to FIG. 1. Each conversion unit 12 includes an AC-to-DC conversion unit 122 and a DC-to-DC conversion unit 124. The AC-to-DC conversion unit 122 and the DC-to-DC conversion unit 124 may include or not include an isolated transformer 12A inside thereof (expressed in dotted lines). The AC-to-DC conversion unit 122 is coupled to the AC power source Vac and the DC-to-DC conversion unit 124, and the DC-to-DC conversion unit 124 is coupled to the bus path 2. Specifically, when the power grid 200 charges the vehicles 300, the AC-to-DC conversion unit 122 receives the AC power source Vac, converts the AC power source Vac into a first DC power source Vdc1, and provides the first DC power source Vdc1 to the DC-to-DC conversion unit 124. The DC-to-DC conversion unit 124 converts the first DC power source Vdc1 into a bus power source Vbus and provides the bus power source Vbus to the bus path 2. When the vehicles 300 feed power back to the power grid 200, the DC-to-DC conversion unit 124 receives the bus power source Vbus, converts the bus power source Vbus into the first DC power source Vdc1, and provides the first DC power source Vdc1 to the AC-to-DC conversion unit 122. The AC-to-DC conversion unit 122 converts the first DC power source Vdc1 into the AC power source Vac and provides the AC power source Vac to the power grid 200.

Figure 2B:
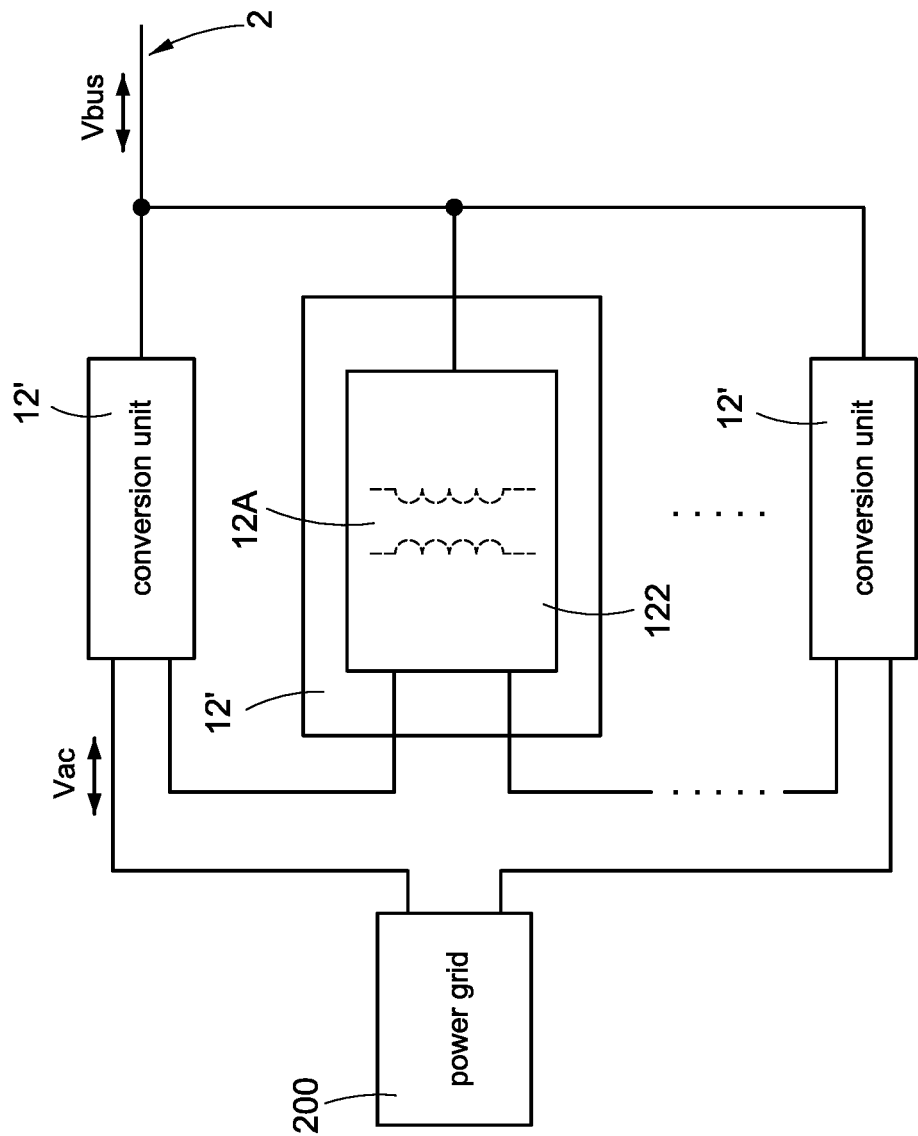
FIG. 2B is a block diagram of a conversion unit according to a second embodiment of the present disclosure.

Please refer to FIG. 2B, which show a block diagram of a conversion unit according to a second embodiment of the present disclosure, and also refer to FIG. 1 to FIG. 2A. Each conversion unit 12' includes an AC-to-DC conversion unit 122, and the AC-to-DC conversion unit 122 may include or not include an isolated transformer 12A inside thereof (expressed in dotted lines). One end of the AC-to-DC conversion unit 122 is coupled to the AC power source Vac and the other end of the AC-to-DC conversion unit 122 is coupled to the bus path 2. Specifically, when the power grid 200 charges the vehicles 300, the AC-to-DC conversion unit 122 receives the AC power source Vac, converts the AC power source Vac into a bus power source Vbus, and provides the bus power source Vbus to the bus path 2. When the vehicles 300 feed power back to the power grid 200, the AC-to-DC conversion unit 122 converts the bus power source Vbus into the AC power source Vac and provides the AC power source Vac to the power grid 200.

Figure 3:
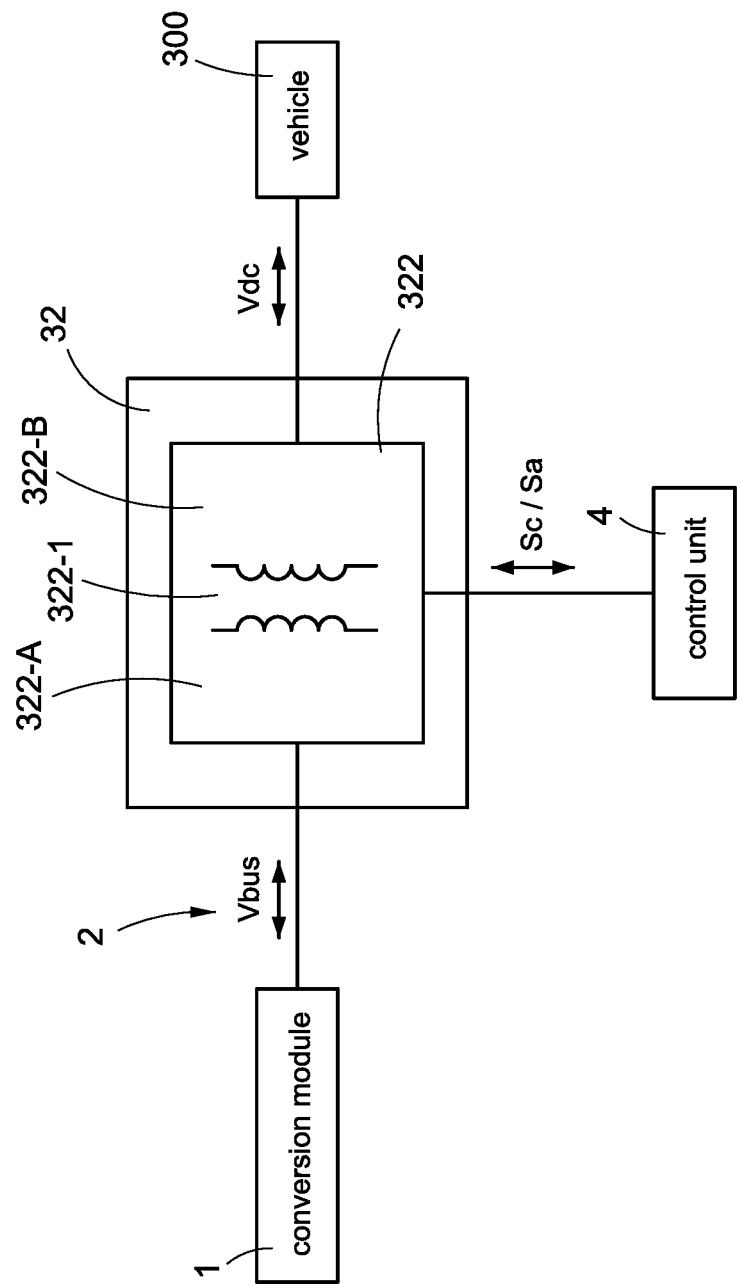
FIG. 3 is a block diagram of a charging unit applied to the SST structure according to the present disclosure.

Please refer to FIG. 3, which shows a block diagram of a charging unit applied to the SST structure according to the present disclosure, and also refer to FIG. 1 to FIG. 2B. Each charging unit 32 includes a DC conversion unit 322. The DC conversion unit 322 has an isolated transformer 322-1, and a primary side of the isolated transformer 322-1 is a first side 322-A of the DC conversion unit 322 and a secondary side of the isolated transformer 322-1 is a second side 322-B of the DC conversion unit 322. The first side 322-A of the DC conversion unit 322 is coupled to the bus path 2, and the second side 322-B of the DC conversion unit 322 is coupled to the vehicle 300. In one embodiment, the number of the conversion units 12 shown in FIG. 2A and FIG. 2B may be different from the number of the charging units 32 shown in FIG. 3.

When the power grid 200 charges the vehicles 300, the first side 322-A of the DC conversion unit 322 receives the bus power source Vbus, converts the bus power source Vbus into the DC power source Vdc through the isolated transformer 322-1, and provides the DC power source Vdc to the vehicles 300 through the second side 322-B of the DC conversion unit 322. When the vehicles 300 feed power back to the power grid 200, the second side 322-B of the DC conversion unit 322 receives the DC power source Vdc, converts the DC power source Vdc into the bus power source Vbus through the isolated transformer 322-1, and provides the bus power source Vbus to the bus path 2 through the first side 322-A of the DC conversion unit 322. In one embodiment, the reason why the DC conversion unit 322 must include the isolated transformer 322-1 is that the power that each vehicle 300 can provide or receive is not the same, and therefore the isolated transformer 322-1 is provided for electrical isolation between the each of the vehicles 300 and the charging system 100, thereby avoiding a situation in which the charging and discharging power between the vehicles affect to each other.

Figure 4:
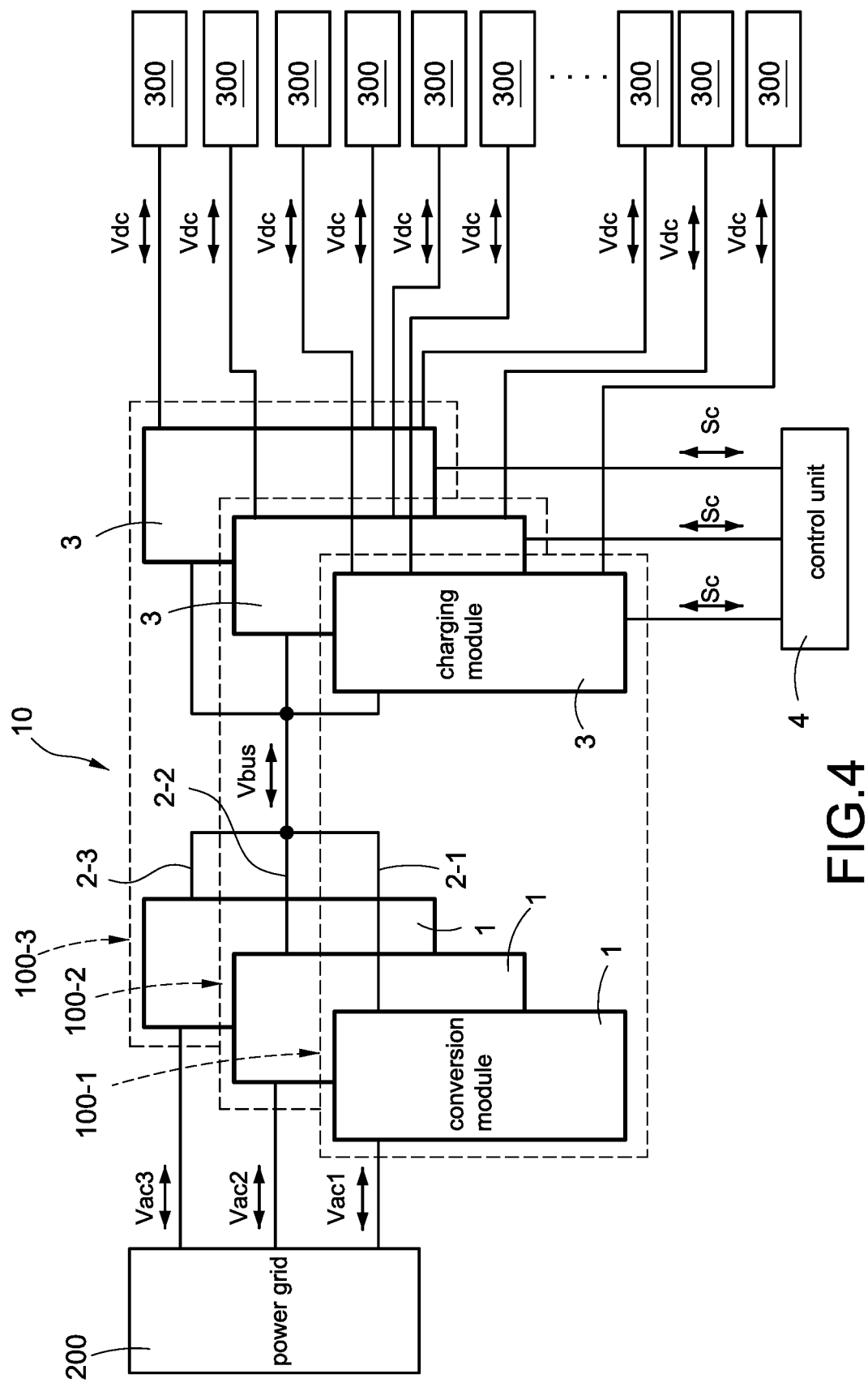
FIG. 4 is a block diagram of a three-phase power system applied to the SST structure according to the present disclosure.

Please refer to FIG. 4, which shows a block diagram of a three-phase power system applied to the SST structure according to the present disclosure, and also refer to FIG. 1 to FIG. 3. The three-phase power system 10 is coupled to the power grid 200 and charges a plurality of vehicles 300, or the vehicles 300 feed power back to the power grid 200. The three-phase power system 10 includes three charging systems 100-1, 100-2, 100-3 shown in FIG. 1, and the charging systems 100-1, 100-2, 100-3 are coupled to AC power sources Vac1, Vac2, Vac3 of the three-phase AC power source respectively. The three-phase AC power source provided by the power grid 200 is not limited to the connection modes, and may be a delta connection (A connection) or a wye connection (Y connection), and may be a three-phase four-wire type or three-phase three-wire type. Take the Y-connected 13.2 kV three-phase AC power source as an example, each phase has a voltage of 7.62 kV. The series-connected head end and the series-connected tail end of the first ends 12-1 of the conversion units 12 in each charging systems 100-1, 100-2, 100-3 are respectively coupled to the live wire and the neutral wire of one phase of the AC power sources Vac1, Vac2, Vac3. The bus paths 2-1, 2-2, 2-3 of one of the charging systems 100-1, 100-2, 100-3 are coupled to each other so that the total bus power sources Vbus converted from the charging systems 100-1, 100-2, 100-3 are collected to the bus paths 2-1, 2-2, 2-3 and then to be allocated. The control unit 4 can be single as shown in FIG. 4, and is coupled to each charging unit 32 of each of the charging systems 100-1, 100-2, 100-3 to jointly control the charging units 32 of each of the charging systems 100-1, 100-2, 100-3. Alternatively, the control unit 4 can be divided into three, and the three control units 4 can individually control the charging units 32 in each of the charging systems 100-1, 100-2, 100-3 and communicate with each other. In one embodiment, the circuit structure inside each of the charging systems 100-1, 100-2, 100-3 is the same as that of FIG. 1 to FIG. 3, and will not be described here.

In conclusion, the present disclosure has following features and advantages:

1. The charging system designs the total power conversion capacity of the power conversion module to be smaller than the total charging power capacity of the charging module. By allocating the demand power capacity of each charging unit through the control unit, the total power conversion capacity of the power conversion module can be small, but still maintain the stable operation of the charging system during the peak of power consumption without causing the power protector be triggered.

2. Due to the application of the charging system combined with the solid state transformer, the conversion unit is suitable for bidirectional conversion between high voltage and low voltage, thereby overcoming the disadvantages of the conventional application only for single frequency and unidirectional voltage transmission.

3. Due to the high frequency characteristic of the conversion unit of the solid state transformer, and the total power conversion capacity of the conversion module is smaller than the total charging power capacity of the charging module, the volume of the charging system can be significantly reduced.

4. The control unit can increase the demand power capacity of the charging unit according to the corresponding activation signal provided by the charging unit, and adjust the demand power capacity of the charging unit with non-corresponding activation signal, thereby avoiding crowding in use.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A energy storage device charging system applied to a solid state transformer structure, coupled to a power grid and charging a plurality of energy storage devices or feeding power back to the power grid from the energy storage devices, the charging system comprising:
   a conversion module comprising a plurality of conversion units, first ends of the conversion units coupled in series and coupled to an AC power source,
   a bus path coupled to second ends of the conversion units,
   a charging module comprising a plurality of charging units, first ends of the charging units coupled to the bus path and second ends of the charging units providing a plurality of DC power sources, and
   a control unit coupled to the charging units,
   wherein a total power conversion capacity of the conversion module is less than a total charging power capacity of the charging module, the control unit is configured to respectively allocate a plurality of demand power capacities of the charging units according to a power conversion upper limit value of the total power conversion capacity.

2. The energy storage device charging system in claim 1, wherein each conversion unit comprises:
   an AC-to-DC conversion unit coupled to the AC power source, and
   a DC-to-DC conversion unit coupled the AC-to-DC conversion unit and the bus path,
   wherein the AC-to-DC conversion unit is configured to convert the AC power source into a first DC power source, and the DC-to-DC conversion unit is configured to convert the first DC power source into a bus power source and provide the bus power source to the bus path, or the DC-to-DC conversion unit is configured to convert the bus power source into the first DC power source, and the AC-to-DC conversion unit is configured to convert the first DC power source into the AC power source.

3. The energy storage device charging system in claim 1, wherein each conversion unit comprises:
   an AC-to-DC conversion unit coupled to the AC power source and the bus path, wherein the AC-to-DC conversion unit is configured to convert the AC power source into a bus power source and provide the bus power source to the bus path, or convert the bus power source into the AC power source.

4. The energy storage device charging system in claim 1, wherein each charging unit comprises:
   a DC conversion unit having a first side and a second side, the first side coupled to the bus path and the second side coupled to one of the DC power sources,
   wherein the DC conversion unit is configured to convert a bus power source provided by the bus path into one of the DC power sources, or the DC conversion unit is configured to convert one of the DC power sources into the bus power source.

5. The energy storage device charging system in claim 1, wherein the plurality of demand power capacities has a plurality of charging upper limit values, and each of the demand power capacities are correspondingly less than or equal to the charging upper limit value.

6. The energy storage device charging system in claim 1, wherein the control unit is configured to receive an activation signal provided by at least one of the plurality of charging units, and adjust the demand power capacity of the at least one charging unit.

7. The energy storage device charging system in claim 6, wherein the control unit is configured to increase the demand power capacity of the at least one charging unit with corresponding activation signal according to the activation signal.

8. The energy storage device charging system in claim 7, wherein the control unit is configured to reduce the demand power capacity of the at least one charging unit with non-corresponding activation signal according to the activation signal.

9. A three-phase power system applied to a solid state transformer structure, coupled to a power grid and charging a plurality of energy storage devices or feeding power back to the power grid from the energy storage devices, the three-phase power system comprising:
   three charging systems, each charging system coupled to one phase AC power source of a three-phase AC power source, and each charging system comprising:
   a conversion module comprising a plurality of conversion units, first ends of the conversion units coupled in series and coupled to the AC power source,
   a bus path coupled to second ends of the conversion units,
   a charging module comprising a plurality of charging units, first ends of the charging units coupled to the bus path and second ends of the charging units providing a plurality of DC power sources, and
   a control unit coupled to the charging units,
   wherein a total power conversion capacity of the conversion module is less than a total charging power capacity of the charging module, the control unit is configured to respectively allocate a plurality of demand power capacities of the charging units according to a conversion upper limit value of the total power conversion capacity.

10. The three-phase power system in claim 9, wherein each conversion unit comprises:
    an AC-to-DC conversion unit coupled to the AC power source, and
    a DC-to-DC conversion unit coupled to the AC-to-DC conversion unit and the bus path,
    wherein the AC-to-DC conversion unit is configured to convert the AC power source into a first DC power source, and the DC-to-DC conversion unit is configured to convert the first DC power source into a bus power source and provide the bus power source to the bus path, or the DC-to-DC conversion unit is configured to convert the bus power source into the first DC power source, and the AC-to-DC conversion unit is configured to convert the first DC power source into the AC power source.

11. The three-phase power system in claim 9, wherein each conversion unit comprises:
    an AC-to-DC conversion unit coupled to the AC power source and the bus path,
    wherein the AC-to-DC conversion unit is configured to convert the AC power source into a bus power source and provide the bus power source to the bus path, or convert the bus power source into the AC power source.

12. The three-phase power system in claim 9, wherein each charging unit comprises:
    a DC conversion unit having a first side and a second side, the first side coupled to the bus path and the second side coupled to one of the DC power sources,
    wherein the DC conversion unit is configured to convert a bus power source provided by the bus path into one of the DC power sources, or the DC conversion unit is configured to convert one of the DC power sources into the bus power source.

13. The three-phase power system in claim 9, wherein the bus paths of the charging systems are coupled to each other.

14. The three-phase power system in claim 9, wherein the plurality of demand power capacities has a plurality of charging upper limit values, and each of the demand power capacities are correspondingly less than or equal to the charging upper limit value.

15. The three-phase power system in claim 9, wherein the control unit is configured to receive an activation signal provided by at least one of the plurality of charging units, and adjust the demand power capacity of the at least one charging unit.

16. The three-phase power system in claim 15, wherein the control unit is configured to increase the demand power capacity of the at least one charging unit with corresponding activation signal according to the activation signal.

17. The three-phase power system in claim 16, wherein the control unit is configured to reduce the demand power capacity of the at least one charging unit with non-corresponding activation signal according to the activation signal.

* * * * *